United States Patent [19]

Wirth

[11] 3,757,699

[45] Sept. 11, 1973

[54] PNEUMATIC SUSPENSION SYSTEM
[75] Inventor: Gary J. Wirth, St. Paul, Minn.
[73] Assignee: Uniflo Systems Company, Edina, Minn.
[22] Filed: Apr. 15, 1971
[21] Appl. No.: 134,211

[52] U.S. Cl............. 104/23 FS, 104/134, 180/118, 180/124
[51] Int. Cl............................................. B60v 1/16
[58] Field of Search.......................... 180/118, 124; 104/23 FS, 134

[56] References Cited
UNITED STATES PATENTS

| | | | |
|---|---|---|---|
| 3,086,479 | 4/1963 | Kucher | 104/134 |
| 3,276,530 | 10/1966 | Borneman | 180/124 |
| 3,302,587 | 2/1967 | Knox, Jr. | 104/23 FS |
| 3,327,799 | 6/1967 | Guienne et al. | 180/124 |
| 3,424,266 | 1/1969 | Cockerell | 180/124 X |
| 3,439,772 | 4/1969 | Giraud | 104/134 X |
| 3,477,387 | 11/1969 | Bing | 104/23 FS |
| 3,513,934 | 5/1970 | Crowley | 180/124 |
| 3,540,378 | 11/1970 | Giraud | 104/23 FS |
| 3,598,198 | 8/1971 | Williams | 180/124 X |
| 3,601,214 | 8/1971 | Bertin et al. | 180/118 |

Primary Examiner—Robert J. Spar
Attorney—Dugger, Peterson, Johnson & Westman

[57] ABSTRACT

A load distribution and vehicle leveling system for a levitated vehicle operating along a surface and which has inflatable levitation pads or rings mounted on the vehicle. The system relates to provision of a pressure signal to the pads to insure that each of the pads will stabilize at a height to insure proper load carrying capacity.

9 Claims, 6 Drawing Figures

Patented Sept. 11, 1973
3,757,699
2 Sheets-Sheet 1
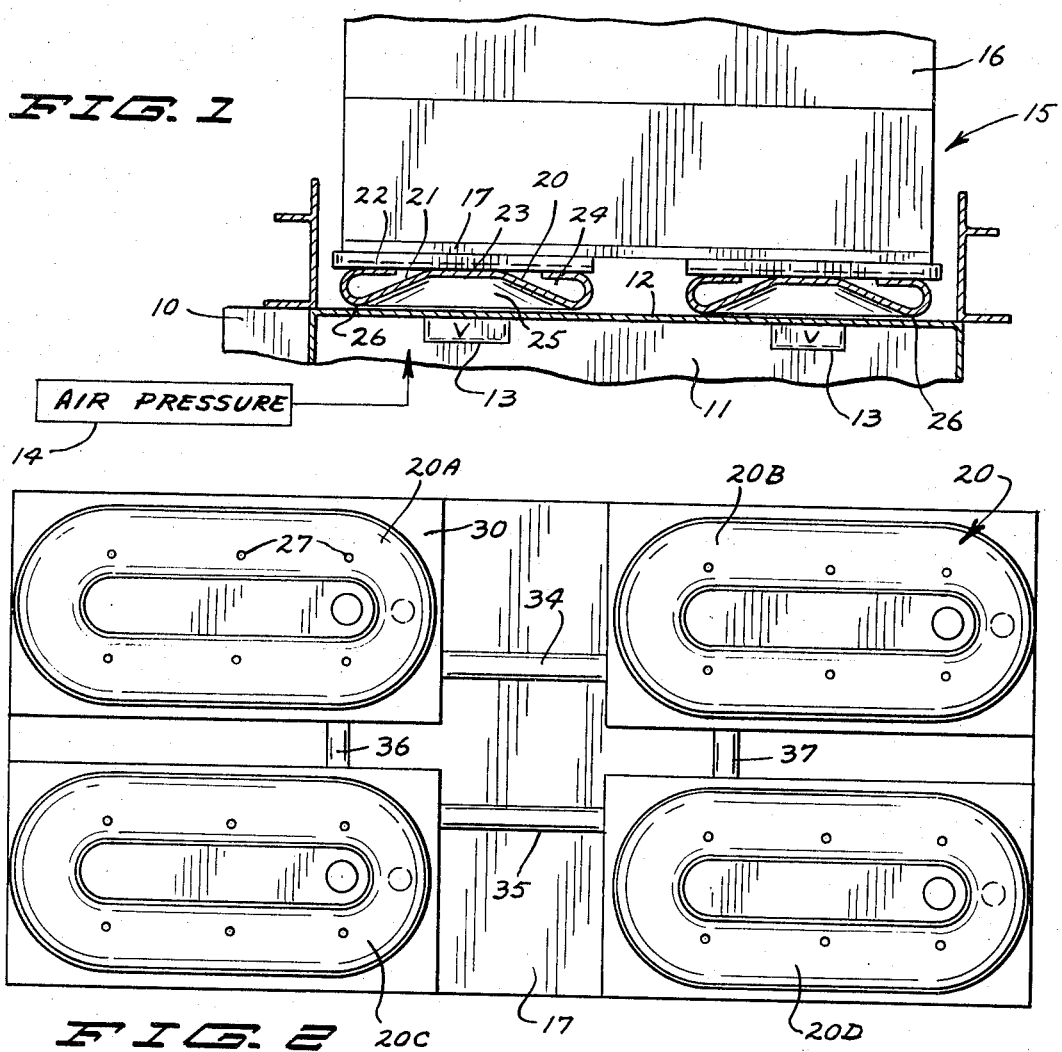
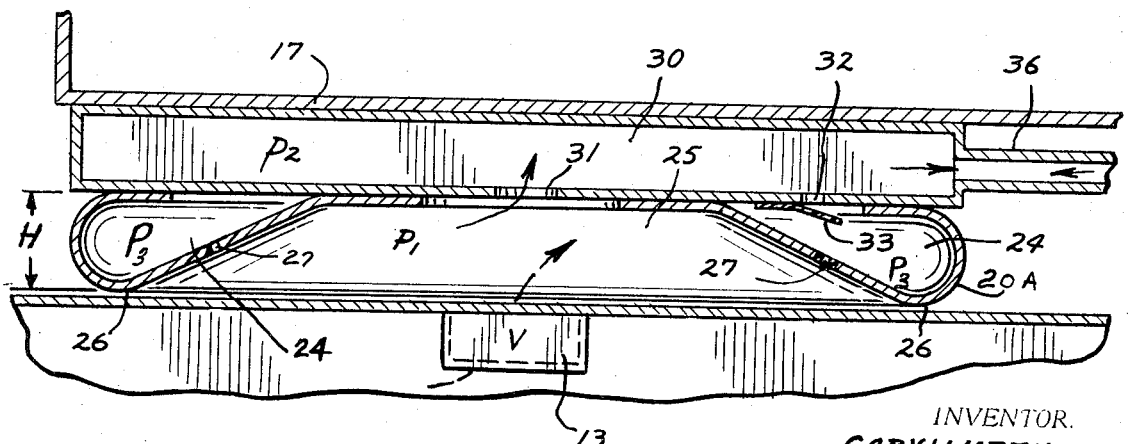
INVENTOR.
GARY J. WIRTH
BY
Dugger, Peterson, Johnson & Westman
ATTORNEYS

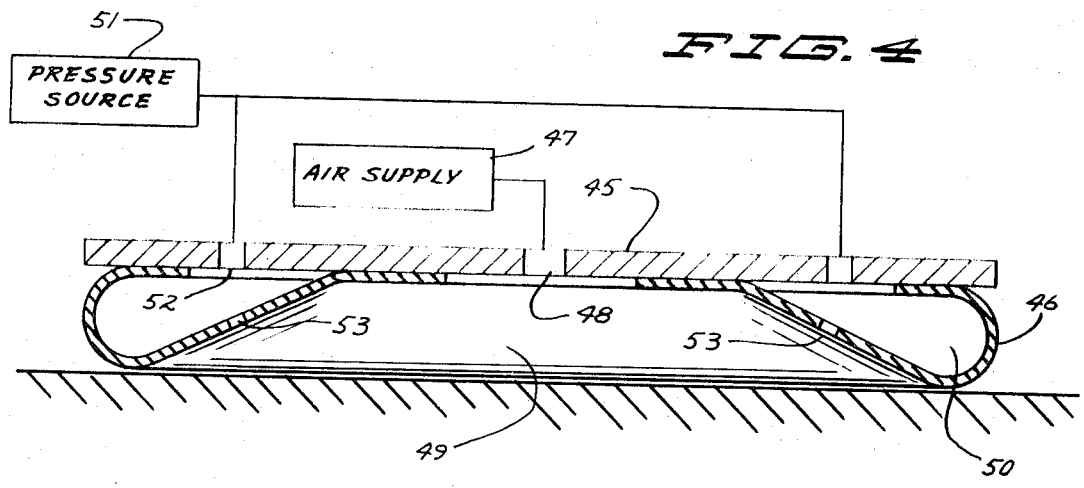
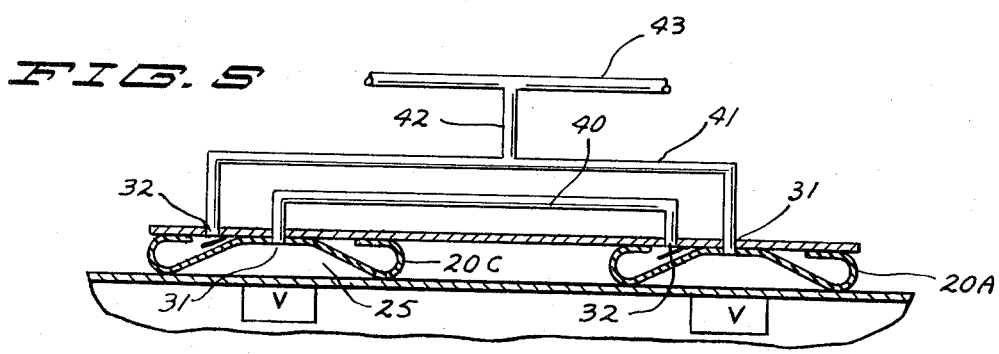
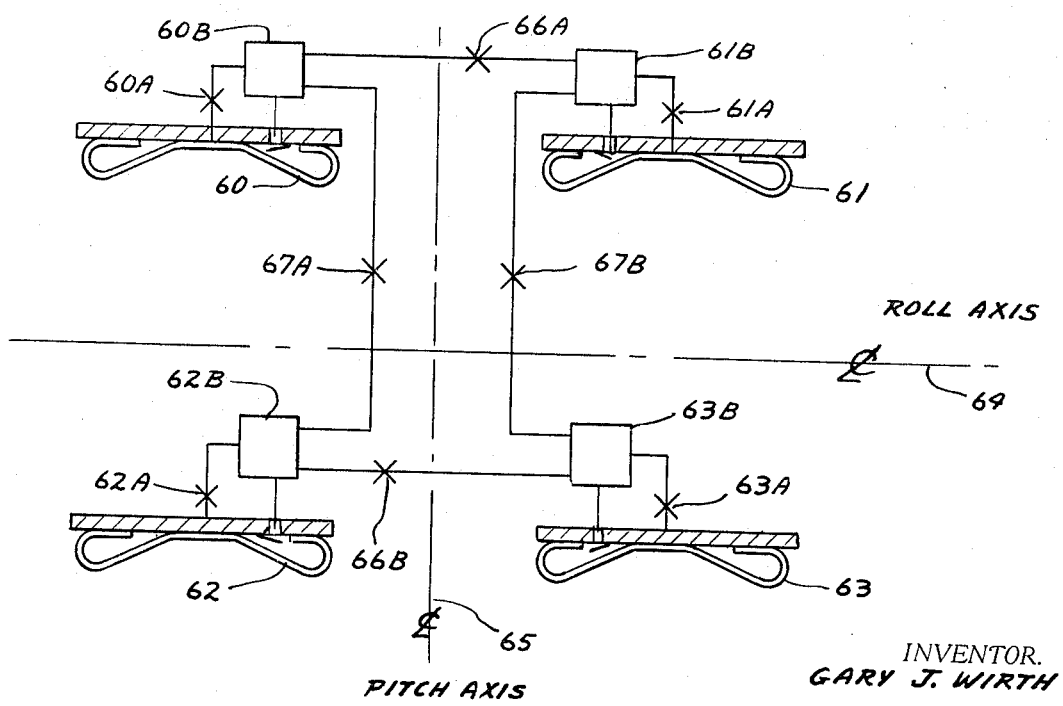

PNEUMATIC SUSPENSION SYSTEM

BACKGROUND OF THE INVENTION

1. Field of the Invention

The present invention relates to the levitated vehicle and more particularly to a pneumatic coupling system for use with such vehicles.

2. Prior Art

There are many types of levitated vehicles which use an inflated flexible pad or cushion underneath the vehicle. One problem that has faced designers is how to distribute loads to all pads on the vehicle so that on an uneven surface, pad pressures do not go too low or too high. This is desirable even if the vehicle has an onboard or common type air supply. In the type of levitated vehicle which receives levitating air from valves in the surface over which it is running and wherein the signal for opening the valves is the pressure in the levitation pads proper distribution of the load is essential or else one pad may deflate completely, and the valves may no longer open. Proper load distribution requires a "soft pad" that is, one that resembles a spring with a low spring rate so that a change in pad height requires only a moderate change in levitation pressure under the pad.

Another problem is how to maintain a reasonably level vehicle with a non-even distribution of load. If one corner of a vehicle is over-loaded, it will drag. The righting ability property of a vehicle requires a stiff pad. That is, a pad wherein an increase in load results in a small decrease in pad height and levitation height. It is often desirable to have different righting abilities in the pitch and roll axis of a vehicle.

Thus, load distribution properties and righting ability require opposite pad characteristics and, therefore, designing the relative stiffness of the pads must be carefully done. The present invention deals with an improved method of getting proper pad stiffness for any levitated vehicle.

Prior art configurations include those shown in U.S. Pat. Nos. 3,260,322 (Mackie) and No. 3,052,483 (Petersen). Stiffness of the pads can be controlled only by changing pad design. That is, an increase in the pads cross-sectional size causes a softening of the pad. This is not the most convenient method. Another problem with the devices shown in these patents is that if a pad de-levitates for some reason, or does not get levitated originally, it will not re-levitate reliably. Further, these vehicles cannot be made to have different stiffness between pitch and roll (other than through vehicle configuration).

Other vehicles are shown in U.S. Pat. Nos. 3,357,511 (Mackie) and No. 3,392,800 (Swamy). In pads of this type, stiffness can be controlled by pressure of the air supply and the sizes of orifices leading into the pad and through the pad wall. This configuration requires a common or on-board fluid supply system. The vehicle cannot be made to have different stiffness between pitch and roll (other than through vehicle configuration). The pads are self-starting if they should accidentally de-levitate, however there may be some problem with this pad being too "soft" in use, since U.S. Pat. Nos. 3,251,432 (Fisher), Nos. 3,245,487 (Mackie), and Nos. 3,511,330 (Livesay) deal with mechanical flow controls to maintain the levitated vehicle in a level condition. In U.S. Pat. No. 3,357,511 the difference between the pressure inside the pad itself and the pressure underneath the pad provides a control signal which determines how stiff the pad is. One problem with this type of pad is that it mixes the stiffness control signal with the air supply which makes it difficult to design the proper control into the pad.

The present invention separates the air supply from the control signal. The air with the present device can come from a supply in the vehicle or from a support deck. Any stiffness of the pad desired can be obtained. Also different stiffness can be obtained in the roll and axis. The pads are self-starting if they de-levitate. The pad has only minor sensitivity to flow changes from the air supply.

SUMMARY OF THE INVENTION

The present invention relates to a levitated vehicle supported by levitating fluid using flexible plenum chamber pads wherein the stiffness of the pads may be regulated. The stiffness is regulated by supplying a pressure signal which controls the relative stiffness of the flexible pad while it is levitated. The pressure signal for stiffness control may be provided in any desired manner.

As shown, the pads are pneumatically connected together through regulated orifices to insure that the pressure signal from at least one of the pads will be supplied to another pad. The pressure control signals will cause the pads to extend in height to maintain a proper clearance with the surface over which the vehicle is traveling. This will insure the vehicles remain stable and levitated even with uneven loads and uneven track surfaces.

The arrangement finds its primary usefulness where there are four or more individual pads that support the load, because a three pad system, for example, will accommodate a non-flat surface and uneven loads without pad deflation. The control pressure signals will permit one pad to extend or retract in height, if necessary and thus give the vehicle the ability to conform to uneven deck surfaces without deflating one of the pads.

BRIEF DESCRIPTION OF THE DRAWINGS

FIG. 1 is a fragmentary sectional view taken through a track for levitated vehicle and through a levitated vehicle itself showing the general layout of one form of levitated pads made according to the present invention;

FIG. 2 is a bottom plan view of the vehicle of FIG. 1;

FIG. 3 is a sectional view through one of the pads showing the use of the plenum chamber and interconnecting means for the pads; and FIGS. 4, 5 and 6 are schematic representations of modified forms of the invention.

DESCRIPTION OF THE PREFERRED EMBODIMENT

Referring to FIG. 1, a track illustrated generally at 10 is used for a levitated vehicle, and this type of track is well known. The track has a plenum chamber 11 underneath a deck panel 12, and valves shown schematically at 13 which open automatically to permit the air from a pressure source 14 to pass through the plenum chamber 11, and up through the valves 13 to provide fluid under pressure underneath a vehicle illustrated generally at 15 which is to be levitated. The deck 12 is closed except for the valves 13, and as shown, these valves are pilot operated and may be of the type more fully disclosed in the U.S. Pat. No. 3,685,788, issued Aug. 22, 1972 to Roger D. Bloomfield.

The vehicle 15, as shown, has a cargo carrying portion 16, including a platform 17, and underneath the platform there are provided a plurality (as shown 4) of levitating pads 20. These pads 20, are also per se well known in the art and comprise a flexible member 21 that is formed into an enclosed shape and is sealed along its edges to the platform 17 as at 22, and also at its center portions as at 23. The pads thus form a continuous peripheral pad chamber 24, and, when valves 13 under the vehicle open the individual pads are inflated, through openings 27 and a levitation plenum chamber 25 is formed between the low portions of the pad where they almost contact the deck to form a throttling gap 26 (this small gap extends all the way around the pads). The flexible members forming the pads as shown have the inflation openings 27 extending therethrough from the levitation chamber 25 into the peripheral pad chamber 24. As shown, the platform 17 has four individual control pressure plenum chambers 30 formed therebelow, one for each of the pads 20. The pads 20 are identically constructed, and when the vehicle is levitated, the pads will inflate to form the chamber 24, which is termed the pad chamber. The pads 20 clear the deck 12 so that air under pressure that is admitted through the valves 13 will escape through the controlled gap 26 underneath the pads. The levitation chambers 25 are under levitation pressure to levitate the vehicle and when the vehicle has once been levitated the pressure provides a signal which will be used to open the pilot operated valves 13 and therefore keep the supply of levitating fluid flowing under the pads.

As shown, the plenum chambers 30 have center openings 31 to the levitation chambers 25, and have openings 32 operated through a check valve 33 into the pad chambers 24. The openings 31 are used to provide a pressure signal from the levitation chamber of each pad through the plenum chambers to at least one other pad. The pressure signal thus provided to the other pads is separate from the supply of levitating air to the other pads from the aligned valves 13. The plenum chambers 30 as shown are pneumatically connected together so that each of the plenum chambers is connected to at least two of the pads. As shown, there is tube 34 extending between the pads 20A and 20B on opposite ends of the vehicle and on the same side of the vehicle and a connect tube 35 extends between pad 20C and 20D. Connect tube 36 extends between the pads 20A and 20C on the same end of the vehicle and on opposite sides of the vehicle. A connect tube 37 joins pads 20B and 20D.

Where a plurality of pads are used, as shown, four or more, the vehicle platform 17 is relatively stable because it is supported in each of its corners, as shown. However, when the vehicle is on an uneven surface it is possible it will rock diagonally about two corners so that one of the pads is unloaded. The pads are normally quite stiff in respect to changes in their height, and in a conventional system if one corner of the vehicle raises because of the uneven surface, the gap under a stiff pad on that corner can open so that the levitation air under the pad escapes freely. This results in such a decrease in pressure under that pad so that it no longer functions to effectively support the vehicle. Where automatic valves are used the pressure in a levitation chamber may drop so low that the automatically opening valves in the deck (which open in response to pressure) no longer open. Then the pad completely deflates because of loss of levitating air and the vehicle drops down, forcing the vehicle to stop. Even when an on-board levitation air supply is used, it is desirable to have all pads support their share of the load.

In a closed pad (conventional) system, which does not utilize the opening 32 nor the plenum chamber 30, the height "H" of the pad is a function of the pressure $P_1$ (the pressure in interior chamber 25) and the flow out through the throttling gap 26 which will be called $Q;(H=f(P_1,Q)$. The pressure inside the pad chamber 24 is designated $P_3$. Where only the openings 27 are present for pad inflation, the pressure $P_3$ and $P_1$ will be substantially equal. This makes the height of the pad relatively constant, and if the gap 26 is caused to open substantially, when the vehicle and deck separate more, such as due to unevenness of the deck, the pressure $P_1$ will drop, (as will the pressure $P_3$), and there won't be any substantial extension of the height of the pad (H) to reduce the gap because it is stiff. This will cause loss of levitation pressure, therefore loss of support for the vehicle from this pad and when automatic valves are used loss of pressure signal for opening the automatic valves, and consequent stopping of the vehicle.

However, in the present device, the height "H" of the pad is also a function of the differential in pressure between $P_3$ and $P_1$ $(H=f[P_1,Q, (P_3-P_1)])$. Pressure $P_3$ can be substantially higher (or lower if no check valve 33 is used) than $P_1$ because of the presence of separate pressure signals from other pads or from a separate source. The total area of openings 27 is selected to be substantially smaller than the area of opening 32, and the opening 27 can be eliminated entirely if check valve 33 is omitted. If openings 27 were eliminated, with the openings 31 and 32 provided, the pads will still inflate by flow from chamber 25 through openings 31 and 32 with air supplied to the underside of the vehicle through valves 13. If the gap 26 of one pad opens substantially, and the flow out under the pad increases, $P_1$ can drop substantially, but $P_3$ will be maintained at a high lever because of the pressure signals from the other pads through the interconnect systems of tubes 34, 35, 36 and 37. The air supply under the other pads continues through the valves 13 supplying air to such other pads. The pressure signal from the other pads to the one pad will cause an increase in the height H of that pad which tends to close off the gap 26 before the levitation air escapes freely. The interconnect makes the pad act like a soft spring that increases or decreases in height easily because the pressure $P_3$ of each pad is a function of the pressure in the levitation chamber of at least one other pad. The soft pad thus aids in insuring levitation in all conditions. The pressure signal (with very little flow) from the interconnect system causes pad height extension for a pad where the gap 26 has tended to increase; due to the differential in pressure between $P_3$ and $P_1$, which will drop when gap 26 is increased. $P_3$, which is a function of the interconnect pressure follows $P_2$ as long as $P_2$ is greater, when the check valve is used, and if no check valve is used, $P_3$ always follows $P_2$. $P_1$ tends to follow $P_3$ and the change in height $H$ to close the gap 26 permits $P_1$ to follow $P_3$.

The area of the interconnect pipes as for example the pipe 36 which is shown in FIG. 3 is selected so that they form orifices to control the flow out of the plenum chamber 30 for the particular pad to which the chamber is connected. The area of opening 31 for each chamber is therefore smaller than the total area of the interconnect pipes leading from the respective plenum chambers so that the pressure $P_2$ in a plenum chamber can be higher than the pressure $P_1$ in the levitation chamber for that pad because of the pressure from the interconnect system to other pads. The pressure in chamber 25, the pressure $P_2$ in the plenum chamber and the pressure through the connect tubes will tend to equalize. The pressure signal $P_2$ is a function of $P_1$ and the pressures in the connected plenum chambers. By changing the sizes of tubes 34 and 36 this functional dependence can be changed so that different stiffness can be obtained in roll and pitch axes.

The optional check valve 33 maintains the pad in inflated condition even if there is a substantial drop in pressure $P_2$ caused by failure of the interconnect system or deflation of one pad. When the check valve is used the pad is stiff when $P_1$ is greater than $P_2$. This means that the vehicle has good righting ability and the pad will support high local loads. The check valve in opening 32 into the interior of the pad permits the necessary pressure signal to enter the pad to maintain signal $P_3$ but prevents flow out of the pad chamber 24. When the check valve closes, $P_3$ then will follow $P_1$, because of the openings 27.

Referring to FIG. 4, a schematic showing of the concept of the invention is illustrated wherein one of the levitation pads receives its levitation air supply from an on-board source, or some place other than through a valve in the deck. For example, a platform 45 is supporting a weight, and has a plurality of inflatable levitation pads 46, only one of which is shown, attached thereto, and these pads are similar to those previously explained. An air supply 47 is used for supplying levitation air through an opening 48 into the interior levitation plenum chamber 49 defined by the pad 46.

In order to keep the pad stiffness in a desired range, the interior pad chamber 50 is provided with a pressure signal from a source 51 that can be completely separate from the air supply 47, and provides the pressure signal to the pad chamber to maintain the stiffness to the pad 46 at the desired level. This illustrates the concept that stiffness of the pad can be regulated from sources separated from the levitation air source, and also that the levitation air source can be an on-board source as well as a source provided through the deck of a track for the vehicle. The desired stiffness of the pad can be attained by controlling the pressure source pressure 51, and the selection of the openings 52 for the pressure signal, and the openings 53 in through the wall of the pad into the levitation chamber 49 can be regulated as desired.

Referring specifically to FIG. 5, it is shown schematically that the interconnection between the pads of a vehicle can be made so that, for example two pads on one side of the vehicle can be pneumatically connected, to provide a pressure signal for the height control of the other pad, rather than having all pads commonly interconnected. For example, in the schematic showing, the pad 20C is shown, and the interior chamber 25 of the pad 20C is connected through a conduit 40 directly to the opening 32 of the pad 20A, so that the pressure signal $P_3$ inside the pad 20A will be a function of the pressure in the chamber 25 in pad 20C. Likewise, the interior chamber of pad 20A can be connected with the conduit 41 to the opening 32 for the pad 20C if desired. This conduit 41 in turn could be, for example, connected with a cross conduit 42 to a conduit 43 that would lead to the interior chamber of other pads, for example 20B or 20D, which in turn are connected together in the same manner as 20A and 20C in FIG. 4, a valve or central orifice also can be located in conduit 42 if desired.

Thus the pressure signal for providing the increase in height of one pad when that pads raises can be obtained from the levitation chamber of another separate pad, and in this manner variation in connections can be made in order to obtain the levitation characteristics desired.

In vehicles having eight pads for example, the pads can be connected in groups of four, or interconnected in any desired manner. The ability to permit one pad to extend when necessary is important when more than three pads are used, and the interconnect system provides this capability. FIG. 6 is a schematic representation of an interconnect system for a 4-pad vehicle wherein different stiffnesses of pads can be achieved with respect to pitch and roll axes. The pads are only schematically shown, but are constructed as previously described.

As shown, the single vehicle has pads 60, 61, 62 and 63 thereon, and may be levitated from a supply of air below the track deck and through automatic valves or by an on-board supply. The vehicle has a roll axis indicated at 64 and a pitch axis indicated at 65. The levitation chamber formed by each pad is open through a separate orifice 60A, 61A, 62A and 63A to a plenum chamber 60B, 61B, 62B and 63B respectively. The interior pad chamber of each pad is also open through check valves to the respective plenum chambers.

The plenum chambers 60B and 61B, which are for pads on the same side of the roll axis and opposite sides of the pitch axis of the vehicle, are connected together with a line through an orifice 66A. The plenum chambers 62B and 63B, which are also for pads on the same side of the roll axis and opposite sides of the pitch axis of the vehicle are connected together with a line through an orifice 66B. Plenum chambers 60B and 62B are connected with a line through an orifice 67A, and chambers 61B and 63B are connected together through an orifice 67B.

The pad height control signal input to each pad chamber will be the same as its respective interconnect plenum pressure. This pressure is the average of the pad chamber pressure and the pressure in adjacent interconnected plenums. The orifices are chosen to weight this average to get different properties. If the orifices 60A, 61A, 62A and 63A re made large in relationship to orifices 66A and B and 67 A and B the pads will be stiff. If orifices 66A and B are made large with respect to orifices 67A and B the vehicle pads will be softer (have less righting ability) around the pitch axis than the roll axis. An extreme of this case would be if orifices 67A and B were completely blocked off. Then, the vehicle would be very stiff around the roll axis. The interconnect works with, or without the check valves in each pad.

Thus the height of the inflated pads can be made responsive to pressure signals which will make the pads respond properly for desired sharing of the load on the vehicle as well as righting ability. The signal for the inflated pad chambers may be obtained from a separate source, from levitation chambers of other pads or from average pressures of the levitation chambers which may be weighted as desired for proper response.

What is claimed is:

1. In a levitated device supported by air from a source of levitating air, and having a plurality of individual separated flexible inflatable levitation pads forming separate levitation chambers open to the source of levitating air, and said pads further defining interior pad chambers surrounding the levitation chambers, each of said pad chambers including first means open to the source of levitating air for its associated levitation chamber, the improvement comprising means separate from the first means pneumatically connecting each pad chamber with a chamber formed by at least one separated inflatable pad on the device to provide a pad chamber pressure signal separate from the source of levitating air for that respective pad.

2. The combination as set forth in claim 1 and wherein said means separate from the first means comprises means to fluidly interconnect each of said pad chambers for fluid pressure communication with a levitating chamber of at least one pad on said device.

3. The combination as specified in claim 2 and orifice means in said means to interconnect said pad chambers and selected to provide a desired amount of pressure drop between said chambers.

4. The combination as specified in claim 1 wherein the device is a vehicle, said pads comprising flexible members depending from the vehicle, pressure signal opening means from each of said pad chambers to said interconnect means, and check valve means in said signal opening means to prevent fluid from flowing out said pad chambers into said interconnect means, but to permit flow of fluid from said interconnect means back into said pad chamber.

5. The combination as specified in claim 2 and a separate plenum chamber for each of said pads, each of said levitation chambers opening to an associated plenum chamber, and said interconnect means being open to said plenum chambers, the opening from each levitation chamber to its respective plenum chamber being of smaller area than the total area of openings leading from each plenum chamber to said interconnect means.

6. The system of claim 1 wherein said levitated device operates on a track, said source of levitating air comprising a source of air under pressure available through said track, and valve means in said track to control flow of levitating air through said track.

7. In a levitated vehicle movable along a track and supported by air from a source of levitating air comprising valve means in the track operable to supply air under pressure to the underside of the track, said vehicle having a plurality of individual separated flexible inflatable levitation pads on the underside thereof, each forming a separate levitation chamber open to the track to receive levitating air, and said pads further defining interior pad chambers surrounding the levitation chambers, each of said pad chambers including first passage means open to the levitating chamber formed by said pad to provide a pressure inside said chamber which is a function of the pressure in its associated levitation chamber, the improvement comprising means separate from the first means pneumatically connecting the interior of each pad chamber with a levitation chamber formed by at least one of the separated inflatable pads on the vehicle to provide a pad chamber pressure signal which is a function of the pressure in the levitation pressure in a levitation chamber of a different pad, said means separate being selected so that the pad chamber pressure signal is provided by said separate means when the pressure in the levitation chamber of that pad drops significantly.

8. The combination as specified in claim 7 and orifice means in said separate means fluidly pneumatically connecting said pad chambers to regulate the rate of change of the pressure signals provided to the pad chambers by said separate means at different locations on said vehicle with respect to selected axes of said vehicle.

9. The combination as specified in claim 7 and signal opening means from each of said pad chambers to said separate means, and check valve means in said signal opening means to prevent fluid from flowing out said pad chambers into said separate means, but to permit flow from said separate means back into said pad chamber.

* * * * *

PO-1050
(5/69)

UNITED STATES PATENT OFFICE
CERTIFICATE OF CORRECTION

Patent No. 3,757,699  Dated September 11, 1973

Inventor(s) Gary J. Wirth

It is certified that error appears in the above-identified patent and that said Letters Patent are hereby corrected as shown below:

Column 7, line 22, (Claim 2, line 5) before "pad" insert --other--. Column 8, lines 24 and 25, (Claim 7, lines 19 and 20) cancel "in the levitation pressure".

Signed and sealed this 19th day of March 1974.

SEAL)
ttest:

DWARD M. FLETCHER, JR.
ttesting Officer

C. MARSHALL DANN
Commissioner of Patents